United States Patent [19]

Josephs

[11] Patent Number: 5,703,450

[45] Date of Patent: Dec. 30, 1997

[54] SAFETY GUARD FOR PEDESTRIAN-OPERATED MACHINES HAVING ROTATABLE BLADES

[76] Inventor: Harold Josephs, 25311 Ronald Ct., Oak Park, Mich. 48237

[21] Appl. No.: 666,904

[22] Filed: Jun. 19, 1996

Related U.S. Application Data

[60] Continuation-in-part of Ser. No. 514,302, Aug. 11, 1995, Pat. No. 5,653,568, which is a division of Ser. No. 266,726, Jun. 27, 1994, Pat. No. 5,465,807.

[51] Int. Cl.$^6$ .................................................. A01D 75/20
[52] U.S. Cl. ........................... 318/379; 318/139; 388/903; 180/271; 180/279
[58] Field of Search ....................... 318/587, 671, 318/672, 362, 558, 372, 373, 375, 379, 380, 139; 388/903, 936, 937; 180/271, 274, 275, 277, 279

[56] References Cited

U.S. PATENT DOCUMENTS

| | | | |
|---|---|---|---|
| 313,842 | 3/1885 | Wright | 187/300 |
| 1,486,027 | 3/1924 | Mayotte | 187/300 |
| 2,048,514 | 7/1936 | Peelle | 268/39 |
| 2,902,105 | 1/1959 | Wiley et al. | 180/82 |
| 2,965,827 | 12/1960 | Hohne, Jr. | |
| 3,107,321 | 10/1963 | Osawa | |
| 3,379,949 | 4/1968 | Todd | |
| 3,411,060 | 11/1968 | DePung et al. | 318/283 |
| 3,599,744 | 8/1971 | Satterfield et al. | 180/96 |
| 3,650,097 | 3/1972 | Nokes | |
| 3,664,701 | 5/1972 | Kondur | 293/4 |
| 3,724,586 | 4/1973 | Goodacre | 180/91 |
| 4,091,906 | 5/1978 | Clarke et al. | 192/129 |
| 4,354,339 | 10/1982 | Nokes | |
| 4,392,771 | 7/1983 | Smalley | 414/545 |
| 4,494,058 | 1/1985 | Berti | |
| 4,540,329 | 9/1985 | Martin | 414/545 |
| 4,711,613 | 12/1987 | Fretwell | 414/921 X |
| 4,802,548 | 2/1989 | Kausch | 180/274 |
| 4,934,478 | 6/1990 | Melocik et al. | 180/275 |
| 4,953,665 | 9/1990 | Paquin | 414/921 X |
| 5,023,444 | 6/1991 | Ohman | 250/221 |
| 5,180,275 | 1/1993 | Czechetal | 414/921 X |
| 5,343,739 | 9/1994 | Curry | 212/151 |

FOREIGN PATENT DOCUMENTS

| | | |
|---|---|---|
| 54-31135 | 3/1979 | Japan. |
| 186541 | 11/1982 | Japan. |
| 846782 | 8/1960 | United Kingdom. |
| 2207111 | 1/1989 | United Kingdom. |

*Primary Examiner*—Bentsu Ro
*Attorney, Agent, or Firm*—Brooks & Kushman P.C.

[57] ABSTRACT

A safety guard for a pedestrian-operated or riding machine having rotatable blades and incorporating a strip switch for disabling the motor of the machine upon sensing the presence of an operator's body part or other foreign object in contact with a side of the housing or between the housing of the machine and the ground. The strip switch is secured to the housing and is oriented to be actuated when the machine overruns or contacts a foreign object. Upon actuation, the strip switch disables operation of the motor to prevent the machine's rotating blades or other moving parts below the housing of the machine from striking the foreign object. Another approach to minimizing injury from machinery having rotatable blades is to provide a semi-rigid guard which is attached to the machine body and movable in a forward movement and away from the ground while preventing lateral movement of objects under the machine. The moveable guard will bump into an operator's foot or leg and reduce the possibility of the machine overrunning the operator's foot or leg.

10 Claims, 3 Drawing Sheets

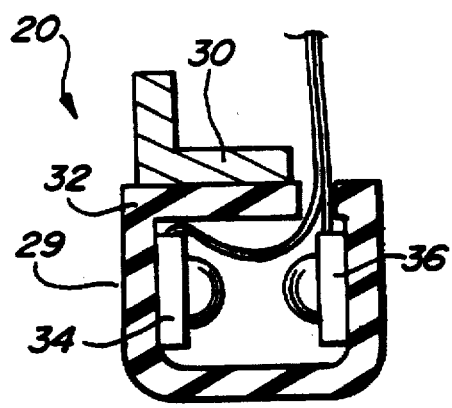
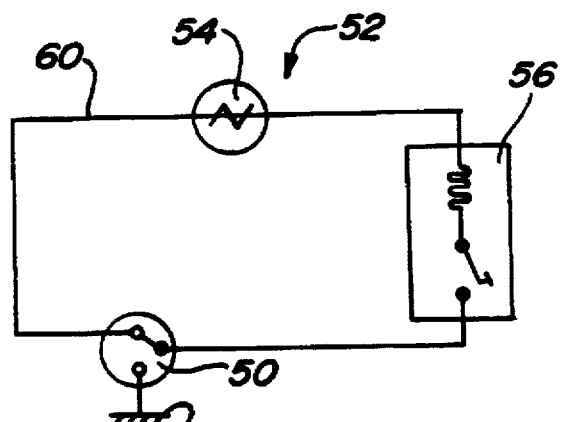
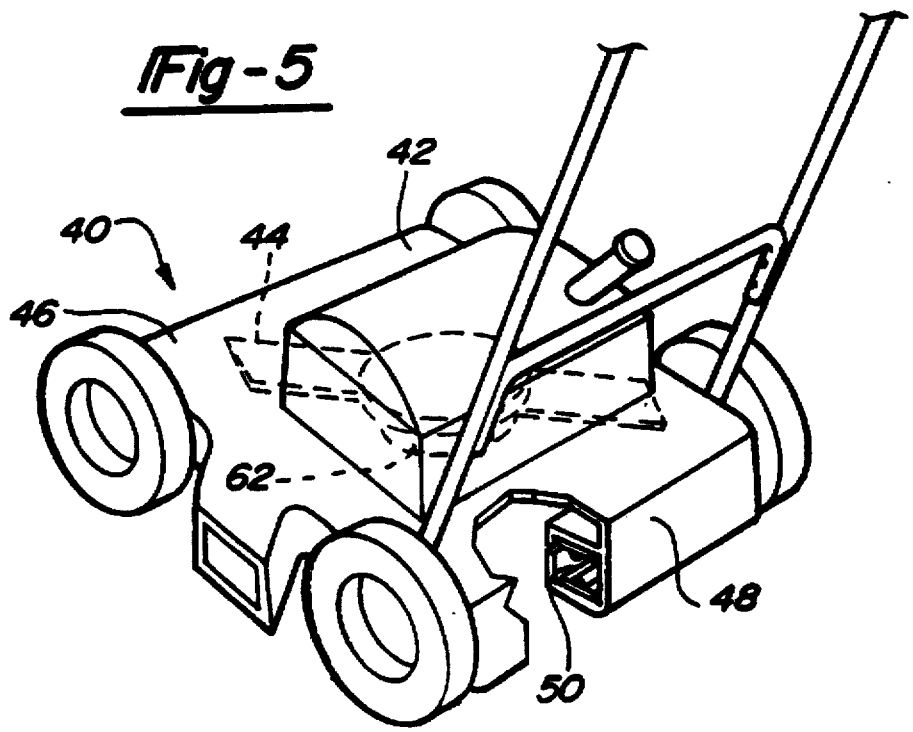

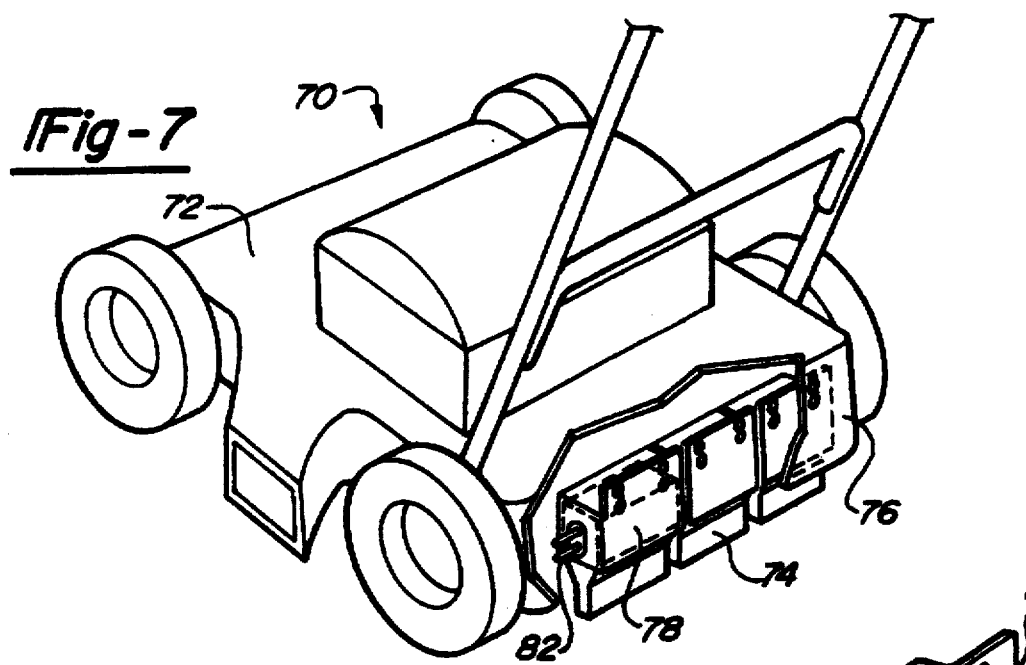
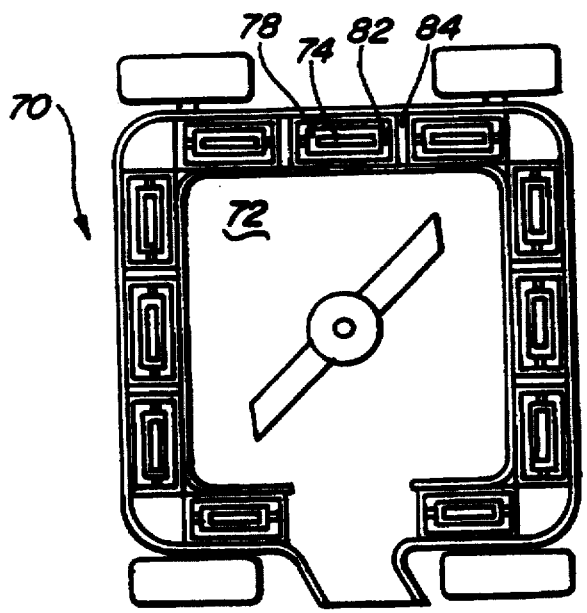
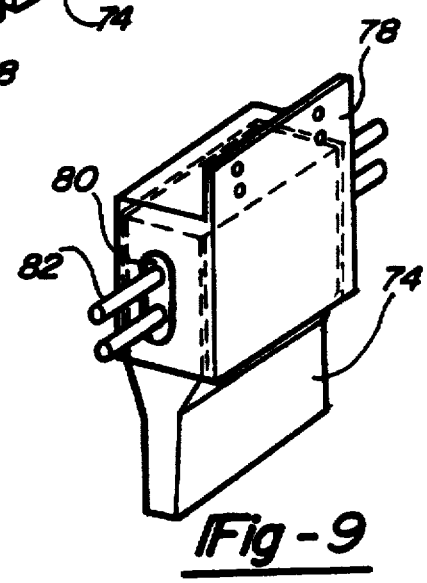
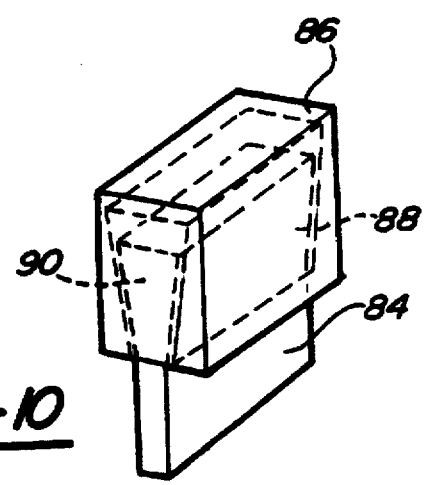

SAFETY GUARD FOR PEDESTRIAN-OPERATED MACHINES HAVING ROTATABLE BLADES

This application is a continuation-in-part of application, Ser. No. 08/514,302, filed on Aug. 11, 1995, now U.S. Pat. No. 5,653,568, which is a divisional application of Ser. No. 08/266,726, filed Jun. 27, 1994, now U.S. Pat. No. 5,465,807.

TECHNICAL FIELD

This invention relates to safety devices for preventing foreseeable injuries caused by the operation of pedestrian-operated and riding machines.

BACKGROUND ART

Accidental injuries are frequently caused by operation of power-driven machinery and equipment with rotatable blades. Serious personal injuries have occurred and are foreseeable in the use of pedestrian-operated machines such as lawn mowers, snow blowers, garden tillers and power edgers.

One common and foreseeable injury involves pedestrian-operated machines which are moved and guided by an operator walking alongside or behind the machine. The operator generally controls the machine by operating controls on the handle while pushing or pulling the handle. The operator typically moves at walking speed or faster alongside or behind the pedestrian-operated machine, sometimes placing a foot within a few inches of the machine. It is therefore foreseeable that an operator's foot or leg could become trapped under the machine. In the case of pedestrian-operation machinery having rotating blades or other moving parts below the body of the machine, serious injury, including amputation or even death, can occur if the machine inadvertently overruns an operator's foot or leg.

Lawn mowers are normally supported by wheels with a clearance space defined between the housing and the ground. Although the lawn mower blade is intended to cut grass, it can also lacerate or break an operator's foot or other body part if the lawn mower is permitted to override the body part and it contacts the whirling blade.

Injury to an operator or a third person is also foreseeable if a pedestrian-operated machine having rotatable blades is operated in such a way as to cause the blades to strike a foreign object. Rotating blades can impact foreign objects causing them to become projectiles. The foreign objects when struck by the rotating blades can cause serious damage to the machine, or to the foreign objects themselves. It is also foreseeable that these foreign objects may become projectiles that can cause a catastrophic injury to the operator or other persons who are near the machinery.

In addition to lawn mowers, both walk-behind and riding, similar undesirable results are also foreseeable in the operation of snow blowers, tillers, and other machines that are rolled over the ground and have power-driven rotatable blades.

Many injuries are caused by pedestrian-operated machinery which does not include proper safety features or danger zone guards. The above-described foreseeable hazards establish that there is a long-felt need for a device for preventing injury as a result of the operation of pedestrian-operated machines with rotatable blades.

SUMMARY OF THE INVENTION

It is an object of the present invention to provide a simple and inexpensive safety guard for pedestrian-operated or riding machinery which disables a motor upon sensing the presence of an operator's body part or other foreign object between the housing of the machine and the ground.

It is another object of the present invention to provide a safety system for a pedestrian-operated or riding machine which disables the motor in the event that the machine contacts an operator's body part or other foreign object.

In carrying out the above objects and other objects and features of the present invention, a machine comprising a housing supported on the ground on a plurality of wheels is disclosed. A motor is supported by the housing. A switch is connected to the motor and it is actuatable to selectively stop operation of the motor. An actuator associated with the switch is secured to the housing. The actuator is oriented on the housing to operate the switch when it contacts an object which is of sufficient height and mass to actuate the actuator.

The actuator is preferably a strip switch disposed about all or part of the periphery of the base of the housing.

In one embodiment, the machine is an internal combustion or electric lawn mower having a blade driven by a motor which is disabled when the actuator contacts an object.

In another embodiment, the machine is an internal combustion or electric lawn mower having a spindle brake that is engaged to stop the blade when the actuator contacts an object.

With internal combustion powered lawn mowers, such as gasoline-powered lawn mowers, the strip switch may be connected to a circuit including an engine magneto and a spark plug. The strip switch grounds the spark plug when the actuator contacts an object to disable the motor thereby stopping rotation of the blade.

With electric lawn mowers, the strip switch may be connected to a circuit including a power source and an electric motor. The strip switch opens the circuit when the actuator contacts an object to disable the motor thereby stopping rotation of the blade.

BRIEF DESCRIPTION OF THE DRAWINGS

FIG. 4 is a cross-sectional view taken along line 4—4 in FIG. 3;

FIG. 5 is a perspective view of a gasoline-powered lawn mower equipped with the safety switch of the present invention;

FIG. 6 is a partial electrical circuit for a gasoline-powered lawn mower equipped with the present invention;

FIG. 7 is a perspective view of a lawn mower equipped with a set of passive guards;

FIG. 8 is a fragmentary, bottom plan view of the set of passive guards equipped on the lawn mower of FIG. 7;

FIG. 9 is a perspective view of one passive guard; and

FIG. 10 is a perspective view of an alternative embodiment passive guard.

BEST MODES FOR CARRYING OUT THE INVENTION

Figure 1:
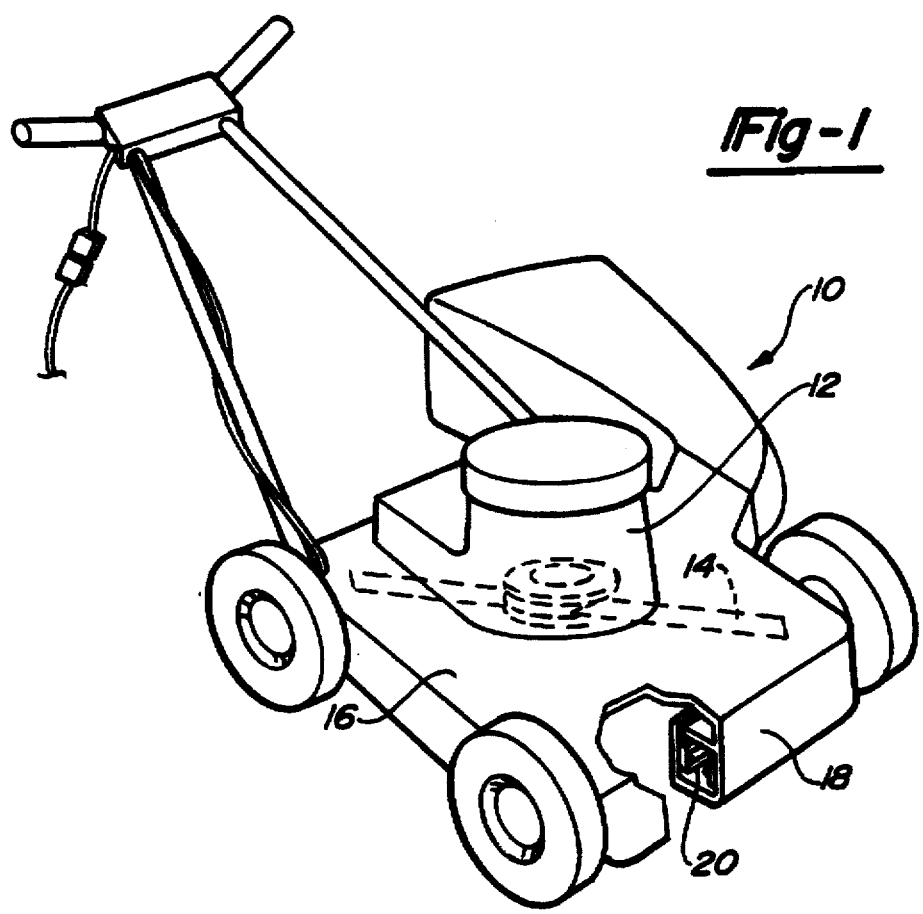
FIG. 1 is a perspective view of an electric lawn mower equipped with the safety switch mechanism of the present invention.

Referring now to FIG. 1, an electric lawn mower 10 is shown. Electric lawn mower 10 includes an electric motor 12 which rotates a blade 14. Blade 14 is within a housing 16 to which motor 12 is attached. On one or more lower edges 18 of housing 16, a strip switch actuator 20 is provided. Strip switch actuator 20 functions to disable motor 12 to stop rotation of blade 14 when it is contacted by an object with more than a predetermined force.

The sensitivity of strip switch actuator 20 must be selected so that it is not actuated if it contacts grass, weeds, leaves, or other materials which lawn mower 10 is intended to cut or mulch. However, strip switch actuator 20 must be designed to be actuatable upon contact with a foreign object such as an operator's foot, a branch, a rock, or other objects which lawn mower 10 is not intended to cut or mulch. As shown in FIG. 1, strip switch actuator 20 is oriented within lower edge 18 of housing 16 to actuate when an object comes into contact with a side surface of lower edge 18. In another mode, referring to FIG. 5, strip switch actuator 50 may also be oriented to be actuated when an object comes into contact with a bottom surface of lower edge 48. Strip switch actuator 50 is preferably fabricated from a relatively stiff elastomer to avoid actuation except when desirable. In addition, the stiff elastomer actuator serves as an additional static guard for the machine.

Figure 2:
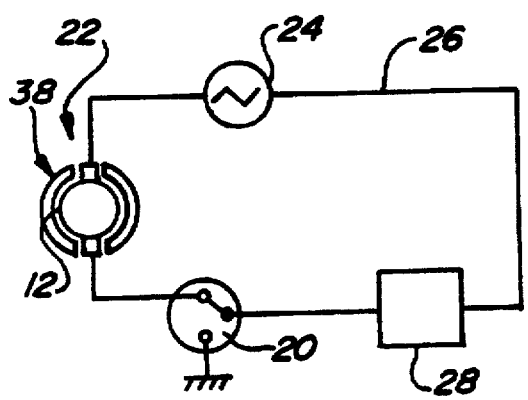
FIG. 2 is a partial electrical circuit for an electric lawn mower equipped with the present invention.

Referring now to FIG. 2, a circuit 22 is shown for strip switch actuator 20 as applied to electric lawn mower 10. Circuit 22 includes a power source 24 which is connected by wires 26 to a latching relay 28, strip switch actuator 20, and motor 12. Power source 24 supplies electrical power to motor 12. Strip switch actuator 20 causes circuit 22 to become open upon actuation thereby interrupting the flow of electrical power to motor 12. Latching relay 28 is provided so that upon actuation of strip switch 20, latching relay 28 latches to prevent restarting of motor 12 until relay 28 is reset according to a predetermined procedure. When latching relay 28 is reset it causes strip switch actuator 20 to close circuit 22 thereby allowing electrical power to flow to the motor 12.

Figure 3:
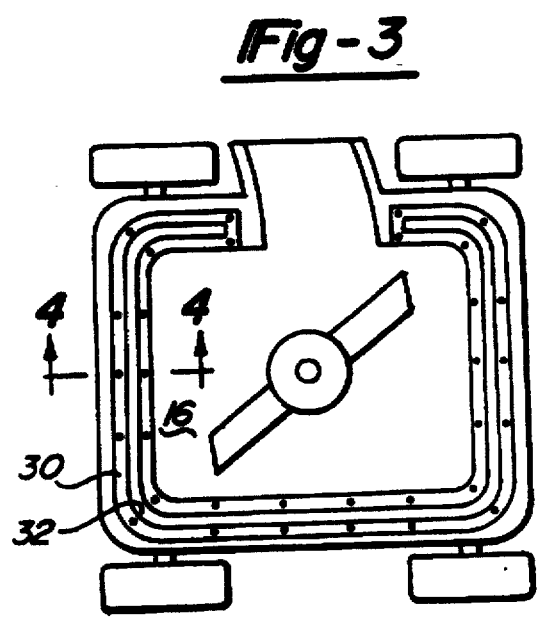
FIG. 3 is a fragmentary, bottom plan view of a strip switch actuator designed for use with the present invention.

Referring now to FIGS. 3 and 4, strip switch actuator 20 will be described in greater detail. Strip switch actuator 20 includes a switch 29 adapted to be fastened to the lower edge 18 of the housing 16. A switch base 30 may be connected to the housing 16 by conventional fasteners such as screws, bolts, rivets, adhesives, or by welding. An elastomeric switch contacting enclosure 32 is secured to switch base 30 and encloses first and second switch contacts 34 and 36.

Elastomeric switch contact enclosure 32 must be fabricated from a relatively stiff or rigid elastomeric material so that contact by objects having relatively low mass will not cause first and second switch contacts 34 and 36 to close. Strip switch actuator 20 can be connected to lower edge 18 with switch contact enclosure 32 extending downwardly from housing 16 towards the ground or outwardly from housing relative to the axis of rotation of blade 14. Circuit 22 may also include a brake mechanism to positively stop the blade 14 upon actuation of strip switch actuator 20.

Referring now to FIG. 5, an internal combustion mower 40 having a gasoline motor 42 is shown. Gasoline motor 42 drives a blade 44 within a housing 46. Housing 46 includes a lower edge 48 to which a strip switch actuator 50 is secured in a manner similar to strip switch actuator 20 of electric lawn mower 10 as described above. In contrast to the orientation of strip switch actuator 20 shown in FIG. 1, strip switch actuator 50 extends downwardly from housing 46 toward the ground.

Referring now to FIG. 6, a circuit 52 is shown for strip switch actuator 50 as applied to gasoline lawn mower 40. Circuit 52 includes strip switch actuator 50, an engine magneto 54, and a spark plug 56. Spark plug 56 is electrically connected in series between the strip switch actuator 50 and the engine magneto 54.

As is known in the art, engine magneto 54 applies a voltage to spark plug 56 causing it to fire. Upon actuation, strip switch actuator 50 opens circuit 52 thereby interrupting application of voltage to the spark plug 56. Strip switch actuator 50 has a contact which is connected to ground 58 for grounding spark plug 56 thereby preventing firing of spark plug 56. Circuit 52 includes wires 60 that interconnect strip switch actuator 50, magneto 54, and spark plug 56. Strip switch actuator 50 has the same physical characteristics as previously described strip switch actuator 20 and will not be repeated for brevity.

Gasoline lawn mower 40 or electric lawn mower 10 may also include a brake mechanism such as a dynamic brake or a spindle brake 62 which may be of the type described in U.S. Pat. No. 3,731,472, the disclosure and drawings of which are hereby incorporated by reference. The use of a spindle brake facilitates rapid stopping of the rotating blade to provide an increased measure of safety. In addition, the housings can be elongated radially outwardly relative to the axis of rotation of the blade to provide additional clearance between the blade tips. The additional clearance will provide more time for the blade to stop and prevent injury.

Due to the difficulty in stopping the rotation of the blades immediately, it may be unavoidable that a foreign object may be contacted at least once by the rotating blades. However, strip switch actuators 20 and 50 in conjunction with a brake of the type described above should stop the blades rapidly enough to eliminate repeated impacts.

Another approach to minimizing injury from pedestrian-operated machinery is to attach a "passive guard", such as a semi-rigid elastomeric floating guard, to the housing to reduce the possibility of the machine overrunning a foot or leg. This approach is passive and does not rely on an electrical circuit. It may be incorporated on pedestrian-operated machinery as a low cost retrofitting.

Referring now to FIG. 7, a lawn mower 70 with a housing 72 is shown. A set of passive guards 74 are attached on one or more lower edges 76 of housing 72. Passive guards 74 extend beneath lower edge 76 towards the ground to minimize the gap between lower edge 76 and the ground. Passive guards 74 are configured to be able to move up and down as lawn mower 70 travels over sticks, rocks, and the like. However, passive guards 74 will act as a barrier to prevent laterally relatively moving objects such as an operator's foot from entering the area beneath lawn mower 70. Upon contact with an operator's foot, passive guards 74 are intended to bump the foot and stop the movement of the lawn mover rather than allowing the foot to be overrun by lawn mower 70.

A bottom plan view of lawn mower 70 with a set of passive guards 74 located uniformly around the periphery of housing 72 is shown in FIG. 8. Preferably, there are two or more passive guards per side of lawn mower 70.

Referring now to FIGS. 7, 8, and 9, the passive guards 74 will be described in greater detail. Each passive guard 74 is fabricated from a replaceable hard polymer material which is fitted within a bracket 78. Bracket 78 has a cut out portion 80 on sides perpendicular to lower edge 76 of housing 72. Bracket 78 is secured to lower edge 76 by conventional fasteners.

A pair of pins 82, preferably made of metal, extend through a cut out portion 80 formed in a passive guard 74.

Pins 82 run parallel to each other and are slidably retained in a slot 84 to allow to movement up and down with respect to the ground. The pins 82 are secured between each passive guard 74 and the housing 72.

An alternative embodiment of a passive guard is shown in FIG. 10. Passive guard 84 is fitted into a bracket 86. Passive guard 84 is shiftably mounted within bracket 86. Bracket 86 has a flared cavity 88. The broadened portion 90 of passive guard 84 is received in the flared cavity which allows a limited range of up and down movement.

The preceding description of the best modes of practicing the present invention as applied to a gasoline or electric lawn mower is intended by way of illustration and not by way limitation. The simple, inexpensive and effective safety guards provided by the present invention can also be incorporated in other types of machines having rotating blades such as snowblowers, tillers and power edgers. The broad scope of the present invention is to be construed commensurate with the broad scope of the following claims.

What is claimed is:

1. A machine comprising:

a housing supported on the ground on a plurality of wheels;

a motor supported by the housing;

a switch connected to the motor, said switch being actuable to selectively stop operation of the motor;

an actuator associated with said switch and secured to a lower portion of the housing and oriented to extend downwardly from the housing toward the ground, said actuator selectively actuating said switch when the housing is moved into contact with an object passing between the housing and the ground which is of sufficient height and mass to move the actuator to actuate the switch; and a brake that is engaged to stop a moving part driven by the motor when said actuator actuates said switch.

2. The machine of claim 1 wherein the motor is an internal combustion motor having a spark plug, said spark plug being electrically connected to said switch.

3. The machine of claim 2 further comprising an engine magneto electrically connected to said switch and said spark plug, said engine magneto provides a voltage to said spark plug, and said switch interrupts the application of voltage to said spark plug thereby disabling said internal combustion motor upon actuation.

4. The machine of claim 1 wherein the motor is an electric motor electrically connected to said switch.

5. The machine of claim 4 further comprising a power source electrically connected to said switch and said electric motor, said power source provides electrical power to said electric motor, and said switch interrupts electrical power to said electric motor upon actuation.

6. The machine of claim 5 further comprising a latching relay electrically connected to said switch, said power source, and said electric motor, said latching relay latches upon actuation of said switch to prevent said switch from continuing to provide electrical power to said electric motor until said latching relay is reset according to a predetermined procedure.

7. A machine comprising:

a housing supported on the ground on a plurality of wheels;

an electric motor supported by the housing;

a switch electrically connected to the motor, said switch being actuatable to selectively stop operation of the motor;

a power source electrically connected to said switch and said electric motor, said power source provides electrical power to said electric motor, and said switch interrupts electrical power to said electric motor upon actuation;

a latching relay electrically connected to said switch, said power source, and said electric motor, said latching relay latches upon actuation of said switch to prevent said switch from continuing to provide electrical power to said electric motor until said latching relay is reset according to a predetermined procedure; and an actuator associated with said switch and secured to a lower portion of the housing, said actuator being oriented on said housing to selectively actuate said switch when an object which is of sufficient height and mass contacts the actuator to actuate the switch.

8. The machine of claim 7 wherein the actuator is a strip switch.

9. The machine of claim 7 wherein said actuator extends downwardly from the body toward the ground.

10. The machine of claim 7 wherein said actuator is oriented outwardly from the body above the ground.

* * * * *